(12) United States Patent
Gschwind et al.

(10) Patent No.: US 10,562,060 B2
(45) Date of Patent: Feb. 18, 2020

(54) COMPACT NEBULIZER FOR FRESHENING THE AIR

(71) Applicant: ARECO FINANCES ET TECHNOLOGIE-ARFITEC, Grasse (FR)

(72) Inventors: Michel Gschwind, Placassier (FR); Frédéric Richard, Golfe Juan (FR); Abbas Sabraoui, Grasse (FR)

(73) Assignee: ARECO FINANCES ET TECHNOLOGIE-ARFITEC, Grasse (FR)

( * ) Notice: Subject to any disclaimer, the term of this patent is extended or adjusted under 35 U.S.C. 154(b) by 429 days.

(21) Appl. No.: 15/326,377

(22) PCT Filed: Jul. 7, 2015

(86) PCT No.: PCT/FR2015/051877
§ 371 (c)(1),
(2) Date: Jan. 13, 2017

(87) PCT Pub. No.: WO2016/009127
PCT Pub. Date: Jan. 21, 2016

(65) Prior Publication Data
US 2017/0203323 A1 Jul. 20, 2017

(30) Foreign Application Priority Data

Jul. 17, 2014 (FR) ..................................... 14 56863

(51) Int. Cl.
*B05B 17/06* (2006.01)
*A47F 3/00* (2006.01)
(Continued)

(52) U.S. Cl.
CPC .......... *B05B 17/0676* (2013.01); *A47F 3/001* (2013.01); *A47F 5/16* (2013.01);
(Continued)

(58) Field of Classification Search
CPC ................ B05B 7/0012; B05B 7/0081; B05B 7/0416–0491; B05B 12/081; B05B 14/00; B05B 17/0615; B05B 17/0676; B05B 17/0607; A47F 3/001; A47F 5/16; A47F 7/00; A61L 2209/132; A61L 9/03;
(Continued)

(56) References Cited

U.S. PATENT DOCUMENTS 5,624,608 A * 4/1997 Ching ................. B05B 17/0607
239/102.2
2007/0216259 A1 9/2007 Kang
(Continued)

FOREIGN PATENT DOCUMENTS

EP 0691162 A1 1/1996
FR 2787352 A1 6/2000
(Continued)

*Primary Examiner* — Cody J Lieuwen
(74) *Attorney, Agent, or Firm* — Jordan IP Law, LLC; Todd A. Vaughn (57) ABSTRACT

Nebulization systems to generate a mist of microdroplets of a liquid for the purpose of refreshing the atmosphere. Such nebulization systems are sized for mounting on a sales display for humidifying and refreshing fresh products displayed for sale.

14 Claims, 6 Drawing Sheets

(51) Int. Cl.
*B05B 7/00* (2006.01)
*B05B 12/08* (2006.01)
*F24F 6/14* (2006.01)
*B60H 3/02* (2006.01)
*A47F 5/16* (2006.01)
*A47F 7/00* (2006.01)
*B60H 3/00* (2006.01)
*F24F 6/00* (2006.01)

(52) U.S. Cl.
CPC .............. *A47F 7/00* (2013.01); *B05B 7/0012* (2013.01); *B05B 12/081* (2013.01); *B05B 17/0615* (2013.01); *B60H 3/0007* (2013.01); *B60H 3/022* (2013.01); *F24F 6/14* (2013.01); *F24F 2006/008* (2013.01); *F24F 2006/146* (2013.01); *Y02B 30/545* (2013.01)

(58) Field of Classification Search
CPC . A61L 9/032; A61L 9/12; A61L 9/122; A61L 2209/134; B60H 3/0007; B60H 3/022; F24F 6/14; F24F 2006/008; F24F 2006/146; Y02B 30/545
USPC ....... 239/4, 68, 102.1, 102.2, 120, 121, 338, 239/369, 433–434.5
See application file for complete search history.

(56) References Cited

U.S. PATENT DOCUMENTS

| | | | |
|---|---|---|---|
| 2008/0000842 A1* | 1/2008 | Matsuura | B01D 1/16 210/748.02 |
| 2008/0011873 A1* | 1/2008 | Gschwind | B05B 15/652 239/102.1 |
| 2008/0223953 A1 | 9/2008 | Tomono et al. | |
| 2009/0053397 A1* | 2/2009 | Buchner | B05B 7/0012 427/74 |
| 2011/0280767 A1* | 11/2011 | Goessens | A61L 9/14 422/106 |
| 2012/0067974 A1* | 3/2012 | Davranche | A47F 7/0078 239/200 |
| 2013/0200536 A1* | 8/2013 | Seremetis | F24F 6/12 261/70 |

FOREIGN PATENT DOCUMENTS

| | | |
|---|---|---|
| FR | 2788706 A1 | 7/2000 |
| WO | 2014177805 A1 | 11/2014 |

* cited by examiner

COMPACT NEBULIZER FOR FRESHENING THE AIR

CROSS-REFERENCE TO RELATED APPLICATIONS

The present application is a National Stage Application of PCT International Application No. PCT/FR2015/051877 (filed on Jul. 7, 2015), under 35 U.S.C. § 371, which claims priority to French Patent Application No. 1456863 (filed on Jul. 17, 2014), which are each hereby incorporated by reference in their respective entireties.

TECHNICAL FIELD

The invention relates to nebulization systems able to generate a mist of microdroplets of a liquid, for example water, for the purpose of refreshing the atmosphere, and more particularly small-sized nebulization systems that can be mounted on a sales display for humidifying and refreshing fresh products displayed for sale.

BACKGROUND

Such systems are known per se. The patent EP 0 691 162 describes a nebulization system with a concentration nozzle in which a piezoelectric element immersed in water generates a mist of water droplets at the outlet of a nozzle that concentrates the ultrasound generated by said piezoelectric element at its outlet point; the mist is next taken away by a stream of air generated by a fan. This nozzle is as a general rule disposed vertically, with the focusing outlet pointing upwards; the nozzle may also be inclined, for example at 45°.

SUMMARY

The aim of the invention is to present an improved nebulization device that can be used to humidify and/or refresh goods, in particular fresh products, displayed for sale on a stall, or for humidifying and/or refreshing and/or perfuming the atmosphere for other purposes, for example in order to cool and/or refresh and/or perfume (and/or disinfect) a volume of air, such as a room in a dwelling or a car passenger compartment, and which is compact, robust, reliable, inexpensive and simple to use, is easy to maintain, and the energy consumption of which is as low as possible.

The requirement for compactness results from the need for an overall small size of the device, and in particular a limited height, which is particularly important when the device is to be integrated in a vehicle passenger compartment or under a table or stall. The requirement for robustness results from the need for resistance of the device to disturbed conditions, and its reliable functioning under disturbed conditions, such as mechanical movements (acceleration, braking, vibrations, shocks, variation in slope). It also results from the desire to avoid frequent maintenance of the nebulizer. The requirement for simplicity in use results in particular from its being impossible in practice to require the user to ensure the regular filling of the nebulizer with water. The requirement for lightness results from the general requirement to limit the weight that is added to a vehicle (and in particular to an aircraft, by the addition of additional options and functions; lightness in all cases facilitates maintenance when it is a case of manipulating the device, and also tends to reduce the environmental impact of the device. The requirement for low energy consumption results from the desire that is becoming widespread to reduce the environmental impact of the products, devices and machines in their lifecycle. The cost requirement militates in favor of a device of simple design.

The problem is solved by a device of novel design that has three parts (modules):

(i) A body comprising a water tank; this body constitutes a bottom part of the appliance.

(ii) A top part comprising a tube for collecting the water jet and an elongate end piece through which the mist generated by the system escapes; this top part is placed on the body.

(iii) An electronic unit fixed to the body, detachably or not, and which can be opened and/or retracted to facilitate maintenance.

The appliance according to the invention is narrow and compact and can be fixed to runners below the table or stall (it can also be fixed above the table), and can be easily brought out and disconnected in order to place it on a table or stall for maintenance work.

The water tank is removable and can be replaced easily.

Each of the three bodies is of substantially elongate form, with the longitudinal axis substantially parallel to the direction of the elongate end piece through which the mist escapes and/or to the direction of the tube for collecting the water jet.

The device comprises a collection tube suitable and arranged for collecting the liquid jet emerging from the outlet orifice and draining into said collection reservoir. This tube may be inclined with respect to the vertical. This collection tube can have an air flow pass through it, which takes away said mist of droplets to its outlet. This further reduces the height of the device and simplifies its design.

Advantageously the collection tube is extended in the elongate end piece through which the mist generated by the system escapes.

The device according to the invention advantageously comprises ventilation means for creating an air flow that takes away said mist of droplets to the outside of said device. This ventilation device can be located in said top part. In an advantageous embodiment, the air enters the system through said ventilation means, passes through the collection tube or a tube in which the collection tube is inserted, and leaves the system through said elongate end piece.

By virtue of its nozzle with focusing of acoustic waves generated by a piezoelectric element, the nebulization device according to the invention is able to create and distribute a mist formed from droplets with a typical mean diameter of between 0.5 μm and 25 μm, preferably between 1 μm and 10 μm, even more preferentially between 1 μm and 5 μm.

Said liquid to be nebulized is preferably water, which may comprise additives such as perfumes and/or disinfectant products (for example: H2O2, peracetic acid, citric acid).

Said nozzle is preferably disposed in line with the collection tube, and therefore preferably slightly inclined with respect to the horizontal. This helps to reduce the height of the device.

The device according to the invention is in particular suitable for tables or stalls with a surface area of up to approximately 5 m2 or more, but it is possible to produce smaller models suitable for tables or stalls with a surface area of less than approximately 3 m2.

In general, said circulation pump may be of any suitable type; a screw-type centrifugal pump is well suited.

The device according to the invention may also comprise at least one means for detecting a lack of liquid associated with a feedback loop for cutting or reducing the intensity of the acoustic waves emitted by the piezoelectric element in the event of a lack of water. This detection means may be a sensor (for example a sensor for the water level in the primary reservoir, and/or a sensor for the pressure in the pressurized chamber), or a plurality of sensors, and/or may comprise a measurement of an electrical parameter of the circulation pump.

In an embodiment that can be combined with all the others, the longitudinal axis of said nozzle forms an angle of inclination a with respect to the horizontal which is between 0° and 45°, preferably between 0° and 30° and even more preferentially between 5° and 20°. This allows a particularly compact design of the device.

In an embodiment that can be combined with the previous ones, the collection reservoir and said nozzle form a single unit.

Advantageously, the top part of the body is made from molded plastics material (preferably reinforced glass fibers, for example to the extent of at least 10% by mass, or at least 10% by mass, or approximately 30% by mass); this affords a lightweight and nevertheless robust construction, in the nature of an ecodesign. The lightness is advantageous for onboard apparatus. It also facilitates maintenance if, as is possible with the device according to the invention, the apparatus is removed entirely from its place of installation (for example under the stall or table that it equips).

The plastics material is preferably a plastic suitable for contact with food, in order not to contaminate the water and mist with traces of undesirable products coming from the plastics materials. Advantageously a recyclable plastic is chosen.

The device may comprise a heating means able to evaporate the residual liquid in said device, and in particular in the tank, after it has stopped. The same heating means may be used to heat the water contained in the device to a sufficient temperature to reduce its pathogenic-germ content.

Another subject matter of the invention is a method for starting a device according to the invention, in which
  (a) liquid is put in the tank;
  (b) when the level of said liquid rises in said tank to a preset point that is detected by a detector for the liquid level in the tank, the circulation pump is started;
  (c) the circulation pump creates a pressure of liquid sufficient for the liquid to be able to enter the nozzle, optionally after having entered the pressurization chamber, and to form a stable jet of liquid that emerges from the outlet orifice, knowing that, during at least part of this time, additional liquid is put into the tank;
  (d) when the level of said liquid in said tank has reached a preset point that is detected by a level detector, the electrical supply to the piezoelectric element is activated in order to create liquid droplets.

In step (d) said preset point and/or said level detector may be the same as at step (b).

DRAWINGS

The device according to the invention is illustrated schematically by FIGS. 1 to 10, which show various views and/or various embodiments thereof.

FIG. 2a shows a lateral view, FIG. 2b a front view of the same device.

DESCRIPTION

The mist diffused by the system (device) 1 according to the invention is generated by the nozzle module 9, which comprises a piezoelectric element 46 stimulating the formation of mist from a liquid that circulates in the system and more precisely in its bottom frame 4. Said nozzle module 9 comprises an acoustic concentrator (nozzle) 49 open in the direction of the mist outlet tube 23 of the top part of the system 1.

The nozzle module 9 comprises a concentration nozzle 49 (also referred to as acoustic concentrator), of a known type, able to contain a liquid to be atomized (typically water) and having an outlet orifice 50, the cross section of the inside of said concentration nozzle 49 having a gradual narrowing in the direction of said outlet orifice 50. Said nozzle 49 further has, on the side opposite to its outlet orifice 50, a (ceramic) piezoelectric element 46 able to emit acoustic waves in the liquid. The inside wall of said nozzle 49 is made from a hard material able to reflect the acoustic waves generated by said piezoelectric element 46. Advantageously, the convergent form of the inside walls of the nozzle 49 is determined so as to focus the ultrasonic acoustic waves at a point close to the central part of the outlet orifice 50; thus a mist of microdroplets of the liquid to be atomized is generated when the nozzle 49 is filled with liquid and the piezoelectric ceramic 46 emits acoustic waves of suitable frequency and intensity. Said convergent form of the inside walls of the nozzle 49 advantageously has radial symmetry. This convergent form is preferably parabolic, which improves the efficiency of the concentration nozzle 49.

According to the invention, and as illustrated in FIG. 4*a*, the longitudinal axis of the nozzle 49 is inclined with respect to the vertical. This inclination, expressed by the angle $\alpha$ with respect to the horizontal, is aimed at reducing the total height of the system 1 and in particular its top part 2. The angle $\alpha$ may be less than 45°, preferably less than 30° and even more preferentially less than 20°. In the context of the present invention, an angle α between 0° and 30° is preferred, and preferably between 5° and 20°.

In addition an almost horizontal functioning of the nozzle 49 (angle 15° for example) assists an increase in flow rate. In this case, the hydraulic pressure on the surface of the piezoelectric element 46 is less and the acoustic waves can therefore propagate more easily in comparison with a vertical functioning of the nozzle. The almost horizontal functioning of the nozzle requires the presence of a circulation pump 42. This pump 42 is optional for vertical or even inclined functioning (for example at 45°), provided however that the whole of the surface of the piezoelectric element 46 is covered with liquid, but the presence of the pump 42 is preferred since it makes the system less sensitive against the effect of variations in flow rate. Moreover, it allows the use of a pressurization chamber 52 as explained below.

The outlet orifice 50 of the nozzle 49 preferably has a circular form. In one embodiment, its diameter is between 3 and 8 mm, and advantageously between 4 and 6 mm; the inside length of the nozzle is advantageously between 25 mm and 42 mm, knowing that this distance corresponds to the near field of the ultrasound generated by the piezoelectric ceramic 46. By way of example, it is possible to use a nozzle 49 with a height of 38 mm, with an outlet orifice with a diameter of 6 mm. The inlet cross section of the nozzle 49 (i.e. the sum of the surfaces of the inlet orifices 51) must be greater than the cross section of the outlet orifice 50 (preferably at least three times greater) in order to avoid the phenomenon of cavitation in the nozzle 49 (as well as a lack of water). This condition is fulfilled for example with four inlet orifices 51 with a diameter of 5 mm for an outlet orifice 50 with a diameter of 6 mm. These inlet orifices 51 ensure good filling of the nozzle 49, reducing the pressure drops in the system and reducing the pressure on the piezoelectric element 46. It is also found that the presence of a plurality of inlet orifices 51 distributed in the bottom part of the nozzle reduces the risk of the formation of bubbles by cavitation during the functioning of the piezoelectric ceramic 46.

Liquid coming from the tank 7 is admitted into the nozzle 49 through at least one inlet orifice 51. Preferably, a plurality of inlet orifices 51 are provided around the longitudinal axis of the nozzle 49 in a zone close to the piezoelectric ceramic element 46. This filling of the nozzle 49 with liquid has two functions. Firstly, knowing that in operation some of the liquid contained in the nozzle 49 starts in the form of a mist, it is necessary to resupply the nozzle 49 with liquid. Secondly, continuous filling of the nozzle 49 associated with the recirculation of the liquid stabilizes the operating conditions of the system 1 even in the presence of mechanical disturbance to the system 1, for example when there is a mechanical impact against the stall on which said system 1 is mounted.

On the rear face of said acoustic concentrator 49 there is said piezoelectric element 46. The latter has an active surface directed towards the outlet 50 of the nozzle 49; this active surface may in particular be planar or concave. During the functioning (electrical excitation) of the piezoelectric element 46, this active surface is immersed in said liquid in order to transmit to it the acoustic waves that it generates. Said piezoelectric element 46 is preferably cylindrical in shape, typically a circular-shaped plate. By way of example, said piezoelectric element 46 may have a diameter of 10 mm or 405 mm, or any diameter lying between these two values. The ultrasonic frequency is advantageously between 0.3 MHz and 3 MHz, preferably between 1.3 MHz and 2.3 MHz. It may for example be 1.68 MHz.

The nozzle module 9 has a flow of liquid to be nebulized passing through it. This flow is generated by a circulation pump 42 that is advantageously situated in the electronic unit 8. The liquid to be nebulized is usually water. The liquid leaves said pump 42 and enters the bottom part of the pressurization chamber 52b of the nozzle module 9, and then the nozzle 49 itself through the at least one inlet orifice 51 in the nozzle. The liquid emerging through the outlet orifice 50 of the nozzle 49, preferably in the form of a small jet, is projected into the collection tube, which enters into the tank 7; the circulation pump 42 draws on the liquid in the tank 7 and makes it enter the nozzle module 9.

When the tank 7 is filled, the liquid enters first of all the bottom part 52b of the pressurization chamber, and then enters (through the inlet orifices in the nozzle 51) the nozzle 49 (and covers the internal face of the piezoelectric element 46) as soon as the level of liquid in the nozzle module 9 is sufficient, the liquid also enters the top part of the pressurization chamber 52a of the nozzle module 9. A small jet of liquid leaves the outlet orifice 50 of the nozzle 49 and, when the level of liquid rises again, it also enters the top part 52a of the pressurization chamber. The circulation pump 42 keeps the liquid in circulation, preferably at a level just sufficient to ensure perfect filling of the nozzle vessel. When the piezoelectric element 46 is operated, the jet of liquid 53 elongates (acoustic pump effect, this is to assist this phenomenon when the pump must preferably be centrifugal in order not to constrict the acoustic pump) and the nozzle 49 produces a mist of fine droplets.

Figure 7:
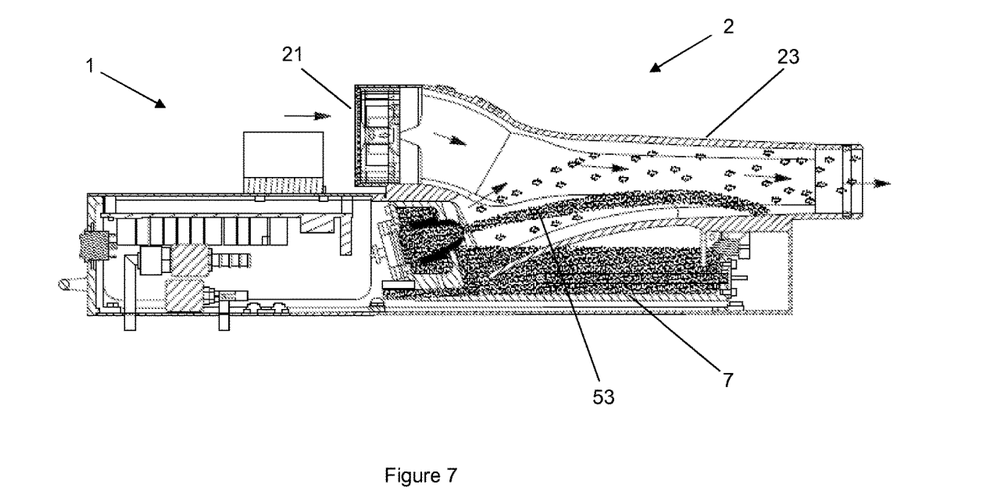
FIG. 7 shows the lateral view of a longitudinal section of the device according to another embodiment of the invention.
Figure 11:
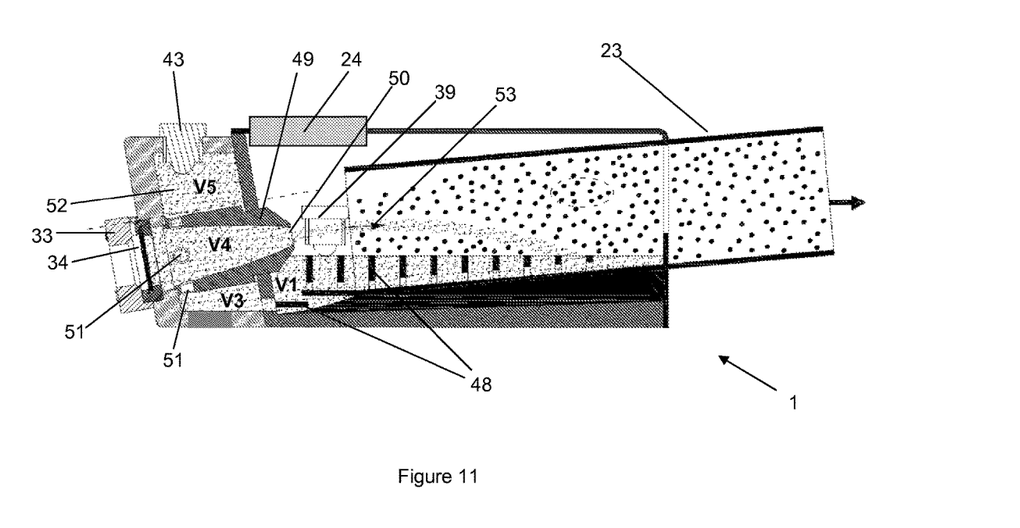
FIG. 11 shows an extract of the lateral view of a longitudinal section of another embodiment of the top part of a device according to the invention.

The jet of liquid 53 generated at the outlet 50 of the nozzle 49 under the effect of the excitation by the piezoelectric element 46 empties into a collection tube 23, the longitudinal axis of which is preferably inclined with respect to the vertical. Preferably, the axis of the collection tube 23 is parallel to the axis of the acoustic concentrator 49, and even more preferentially these two axes coincide.

The collection tube 23 may have passing through it an air flow generated by a ventilation means 24, which is preferably adjustable for flow rate and is situated upstream of, downstream of or inside the collection tube 23. Said air flow enters the nebulization system 1 through an air inlet 21 and (by thrust or aspiration) carries away the microdroplets of liquid generated by the nozzle 49 around the jet of liquid 53. Thus a mist of fine droplets forms, which leaves the collection tube 23 through its outlet 22 and enters its destination environment, for example the passenger compartment of a vehicle or the air space above a stall 8, possibly being conducted through a nebulizer 10 having at least one orifice 16 advantageously provided so as to confer on the mist a required diffusion direction and/or height and/or width.

The jet of liquid 53 is projected against the internal wall of the collection tube 23, and the liquid thus collected flows into the tank 7. Thus the collection tube 23 also serves as a guide tube for the diffusion of the mist.

Advantageously, the guide tube 23 has optimized aeraulic characteristics in order to increase the flow rate of droplets. In particular, the surface around the jet is homogeneous and smooth in order to collect the maximum amount of droplets; the path of the pipe follows the shape of the jet in order not to disturb the hydraulics. This is illustrated in FIG. **4*b***. This form assists the flow of liquid, and prevents any retention of water and any vortex that could disturb the flow of the liquid, in order not to have stagnation zones that would present a risk for the hygiene of the device. This form also reduces the noise related to the flow of liquid and the flow of air: the device according to the invention is particularly silent.

Several other embodiments may be adopted in order to improve the aeraulic characteristics of the system. It is possible to produce the guide tube so as to cause a venturi effect, as illustrated in FIG. 7. It is possible to provide for the air pressurization to be done from the top of the tank, in particular by positioning the fan so that its blades rotate about a substantially vertical axis (FIG. 11). In general terms it is possible to use an axial or centrifugal fan.

Figure 1:
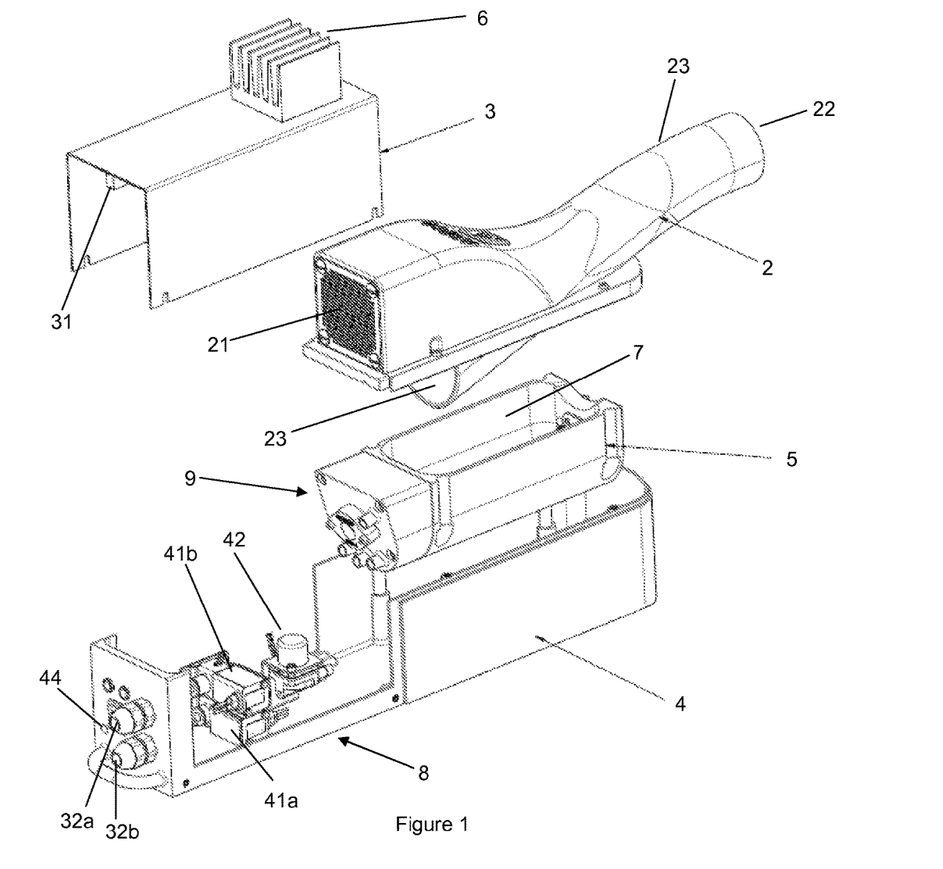
FIG. 1 shows an exploded view of the device showing its top part, its bottom frame and its electronic unit closed by a cap.

In the embodiment of the invention illustrated in FIG. 1, the collection reservoir is represented by the output tube for the mist 23 and forms a single-piece element with the nozzle 49. This simplifies its design; moreover, such a single-piece element is more robust.

Figure 8:
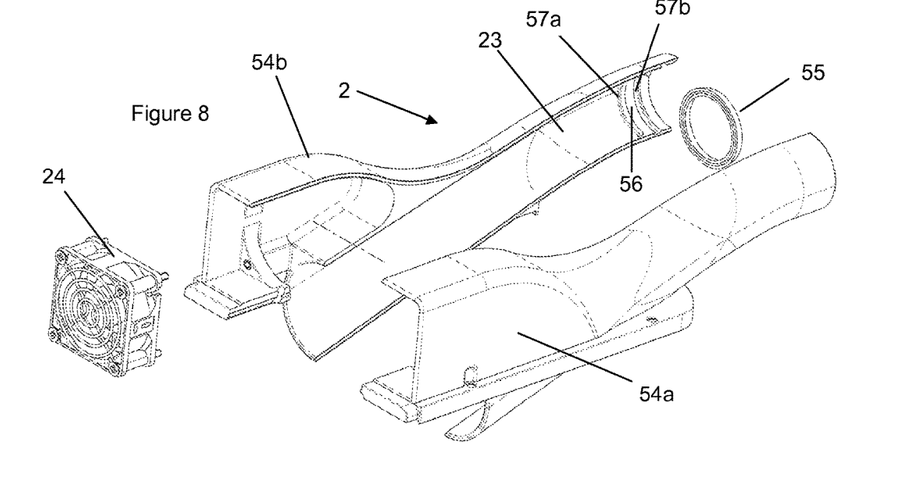
FIG. 8 shows an exploded perspective view of the top part of the device according to a particular embodiment.
Figure 9A:
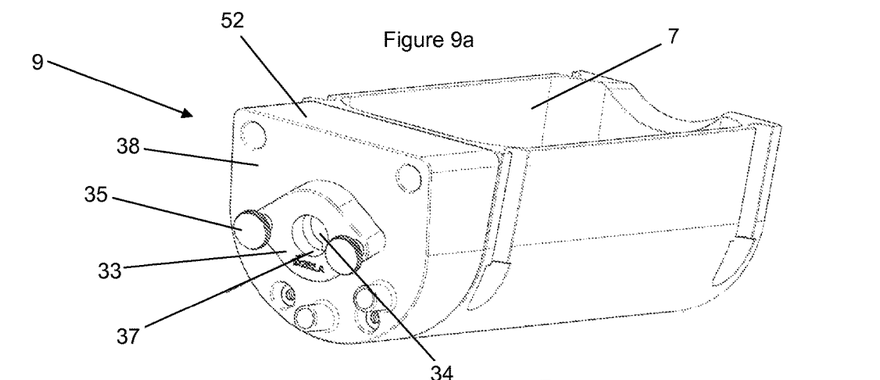
FIGS. 9a and 9b show a perspective view of a particular embodiment of the fixing of the piezoelectric element.
Figure 9B:
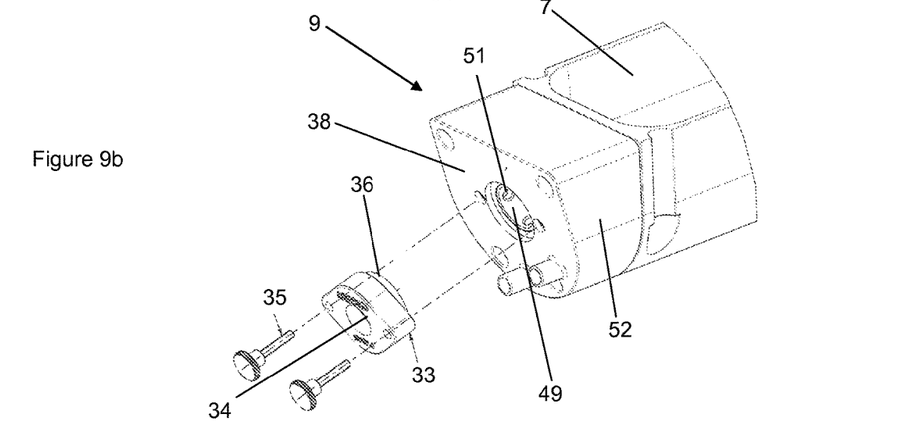

Alternatively it is possible to produce the body of the top part 2 of the device 1 in two parts 54a, 54b, preferably symmetrical, generated by a longitudinal section, as illustrated in FIG. 8. The two parts 54a, 54b can be assembled by any suitable technique, such as screwing, adhesive bonding or snapping on. It is advantageous to insert at least one ring 55 (preferably held in a groove 56 and/or between two rims 57a, 57b) in the direction perpendicular to the axis in order to consolidate the body 54 and provide the sealing and connection to the accommodating compartment 13.

Said piezoelectric element 46 can absorb a large amount of electrical power, for example 30 to 60 W for a diameter of 20 mm. Approximately 40% of this power is rendered in the form of acoustic energy transmitted to the liquid, the rest being dissipated in heat form. According to one embodiment of the invention, the piezoelectric element 46 is mounted on a support 33 that has in its rear part an orifice 34 that emerges on the rear part of the piezoelectric element 46; this orifice 34 contributes to the natural cooling of the piezoelectric element 46. This support 33 can be mounted directly on the rear part 38 of the pressurization chamber 52 in which the nozzle 49 is inserted. It is advantageous to use a gasket 36 to provide the seal between the support 33 and the rear part 38 of the pressurization chamber 52. The support can be fixed by means of preferably reversible fixing means 35, in order to facilitate maintenance, such as a clamping screw. The support 33 can be produced from metal or plastics material, for example polyamide, such as PA66, advantageously containing glass fibers); it must be able to adapt to the thermal stresses between the inside (contact with the piezoelectric element 46) and the outside (air).

In order to avoid damaging the piezoelectric element 46 during its functioning, it must be constantly cooled by the liquid in order to prevent damage thereto by overheating. The inventors realized that, when the piezoelectric element 46 is functioning dry, even for a very short period, it risks being damaged or even destroyed.

To prevent this, the inventors provided for the nebulization system 1 to be able to comprise suitable means for preventing said piezoelectric element 46 functioning (i.e. not emitting acoustic waves or only acoustic waves of very low power) when the piezoelectric element 46 is not immersed in the liquid to be atomized. These means may take various forms, and in general comprise at least one means for detecting the lack of liquid and/or a means for detecting heating of the piezoelectric element 46, and a means of feedback on the electrical supply of said piezoelectric element 46.

Said means for detecting the lack of liquid may be a level sensor or a presence sensor that cuts off or regulates the functioning of the piezoelectric element 46. This sensor may be an optical sensor or a capacitive sensor or an inductive sensor but, among these three, an optical sensor that is preferred, which has better reliability and in particular very low hysteresis (±1 mm). This sensor may be situated at various points, in particular in the collection receptacle, or inside the nozzle 49, or in the pressurization chamber 52 of the nozzle 49. In one embodiment a sensor situated in the tank 7 is used.

Various types of pump may be used for the circulation pump 42. The pump is advantageously of the adjustable rate type; a pump adjustable between 0.1 and 2.8 liters/minute is suitable for a nozzle 49 that has the dimensions indicated above. In one embodiment the circulation pump 42 is a helical pump. Advantageously, this pump absorbs a direct current and the voltage is adjusted so as to vary the rotation speed and therefore the discharge rate at the outlet of the nozzle 49, which does not make it possible to modify the length of the jet.

The device 1 according to the invention, by virtue of its nozzle 49 for focusing acoustic waves generated by a piezoelectric element 46, is able to create and give out a mist formed from droplets with a typical mean diameter of between 0.5 m and 30 m, and more particularly between 0.5 m and 10 m, and preferably between 1 μm and 5 μm. This particle size depends in particular on the frequency of the acoustic waves produced by said piezoelectric element 46.

FIG. 1 shows the three parts of the device 1 according to the invention, namely its top part 2, its bottom frame 4 and its electronic unit 8 closed by a cap 3. Said electronic unit 8 is advantageously disposed behind the bottom frame 4. These three parts are substantially elongate in form. The top part 2 comprises the tube 23 for discharging the mist, which is projected to the front. The bottom frame 4 comprises a tank module 5 comprising a tank 7 and the nozzle module 9. The tank 7 may be separate from the tank module 5 so as to be replaced if necessary. The tube 23 discharging the mist may be curved towards the horizontal in its part close to its outlet 22, and the axis of its outlet is preferably horizontal.

Figures 2A, 2B:
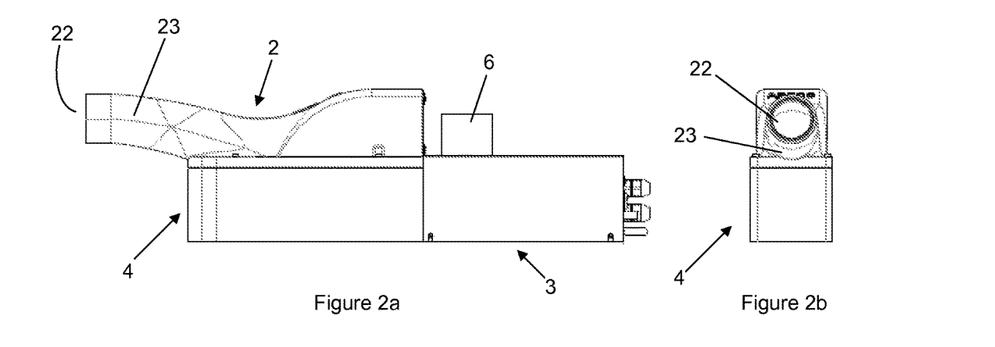

FIG. 2a shows the roughly elongate form of the device 1, with the tube 23 discharging the mist projecting to the front.

FIG. 2b shows that the device 1 is narrow, which assists manipulation thereof for installation, dismantling and maintenance operations.

Figure 3:
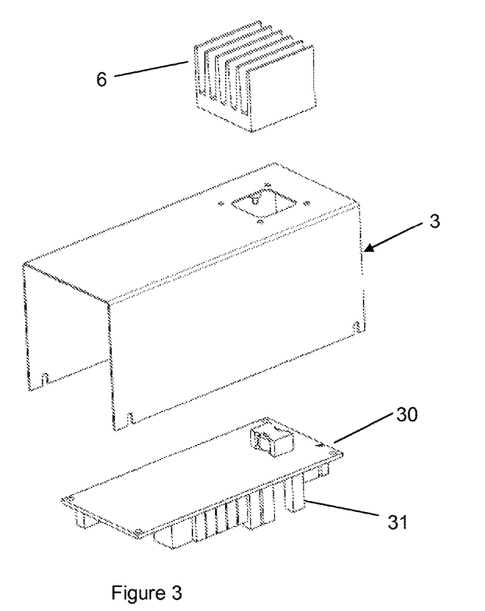
FIG. 3 shows an exploded view of the electronic unit with its cap that protects the electronic card.

As shown in FIG. 3, the electronic unit 8 is covered with a cowl 3. The electronic unit 8 also comprises at least one electronic card 30 provided with electronic components 31; it may be fixed under the cowl 3. The electronic unit 8 advantageously comprises a radiator 6, which is advantageously in thermal contact with the electronic card 30; said radiator may be integrated in the cowl 3.

Said cowl 3 may be produced from metal, which assists the dissipation of heat; in some cases this may make the presence of a radiator superfluous.

Figures 10A, 10B:
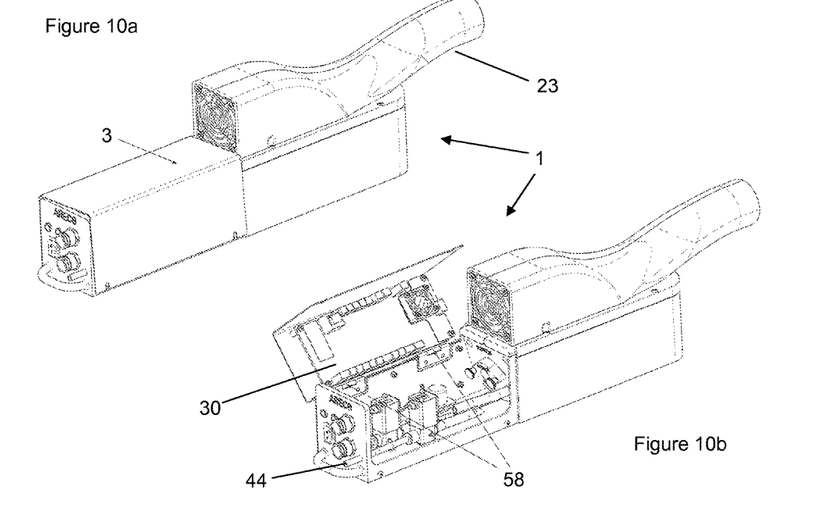
FIG. 10 shows a perspective view of a particular embodiment of the device according to the invention in which the cover (FIG. 10a: closed, FIG. 10b: open) is fixed by lateral hinges.

Said cowl 3 may be connected to said unit 8 by hinges (see FIG. 10); this facilitates access to the components (pump, solenoid valves) during maintenance work.

Figure 4A:
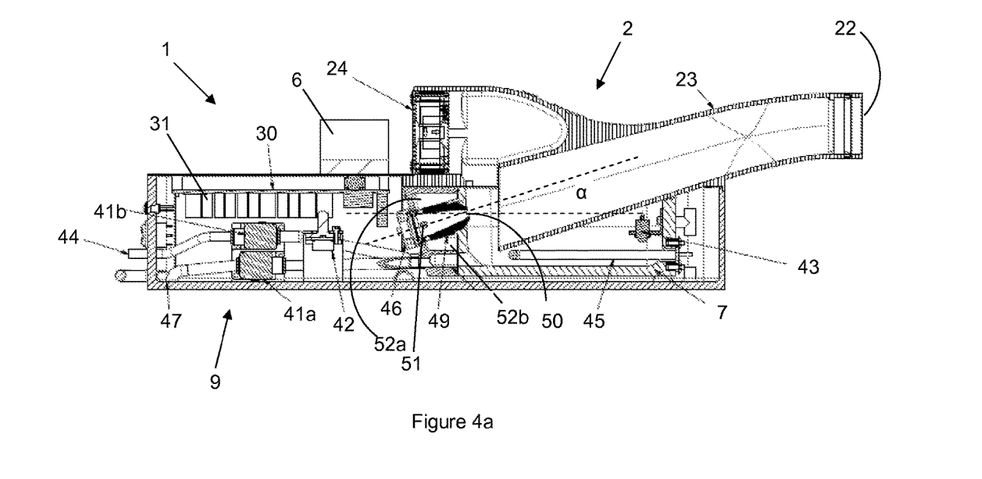
FIG. 4a shows the lateral view of a vertical longitudinal section of the device.

FIG. 4a explains in greater detail the functioning of the device according to the invention. The electronic unit 8 comprises in particular a circulation pump 42 that generates the jet of liquid 53 (water) in the nozzle 49, as described above. The system 1 may be supplied with water from outside: the water enters through a water inlet 44 situated on the rear of the electronic unit, passes through a solenoid valve 41 in the open position and enters the nozzle module 9. To cut off the water the solenoid valve 41 can be closed; this operation can be carried out automatically by the electronic card.

Figure 4B:
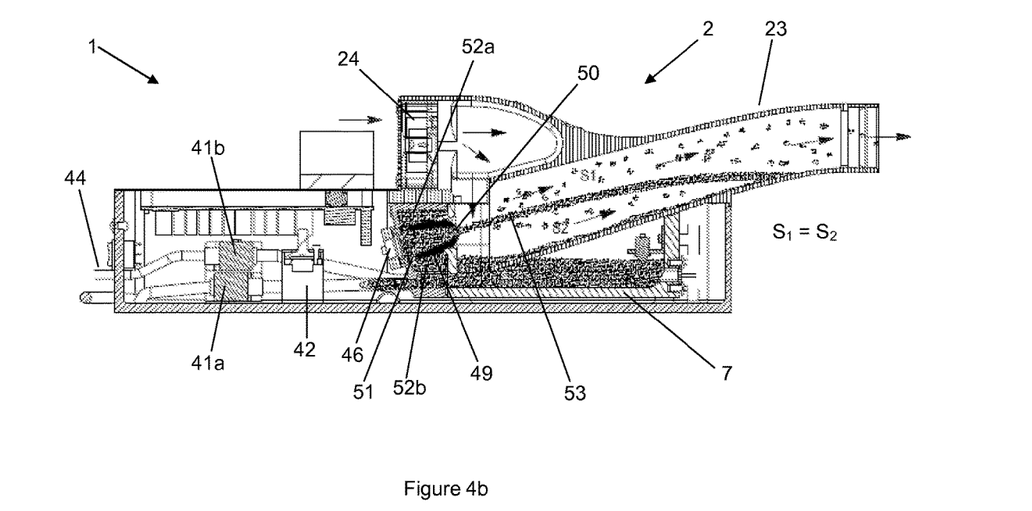
FIG. 4b shows the same cross section of the same device with the liquid levels in normal functioning.

FIG. 4b illustrates the functioning of the device 1 according to the invention: during the filling of the tank 7, the liquid first of all enters the bottom part 52b of the pressurization chamber, and then enters (through the inlet orifices in the nozzle 51) the nozzle 49 (and covers the inside face of the piezoelectric element 46) and finally the top part 52a of the pressurization chamber; a small jet of liquid 53 emerges from the outlet orifice 50 of the nozzle 49. The circulation pump 42 keeps the liquid in circulation.

FIG. 7 shows the lateral view of a longitudinal section of the device 1 according to another embodiment of the invention, in which the air enters in parallel to the jet of liquid that emerges from the nozzle; thus the mist generated by the nozzle is aspirated by the air flow (venturi effect).

Figure 5:
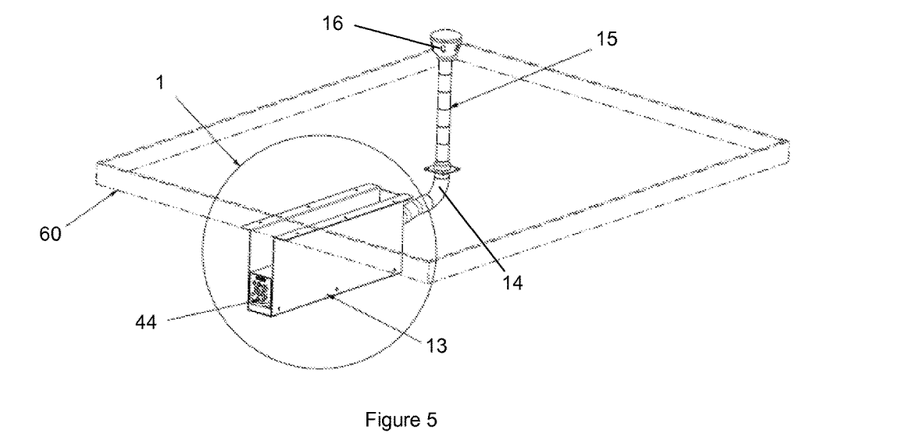
FIG. 5 illustrates the installation of the device under a table or under a stall.

As shown in FIG. 5, the device 1 according to the invention is able to be integrated in a table (stall) 60, that is to say a surface on which objects are displayed, in particular for sale, and which is subjected to the effect of the mist of liquid generated by said device 1. This effect may in particular be a humidifying and/or refreshing effect. Said objects may be food products, in particular fresh plant products (for example fruits or vegetables), seafood (for example fish, crustaceans or mussels), cheeses, meat, meat-based products (for example cooked meats) or non-food products (for example pot plants or cut flowers).

It is also possible to use the device 1 according to the invention in other humidification or refreshing situations, for example in rooms in dwellings, in passenger compartments (in vehicles for example).

In an embodiment illustrated in FIGS. 5 and 6, the device 1 is disposed under said table 60, in an accommodating compartment 13 that emerges on one face of the table 60; said accommodating compartment 13 may be closed by a cowl (not shown in the figures). If the device is mounted under a table 60, the outlet tube 23 for the mist is advantageously extended by a pipe 14 for mist; advantageously said outlet tube 23 for the mist may be inserted in said pipe 14 for mist. The mist is conveyed through said pipe 14 (under the influence of the air flow generated by the fan 24 that takes away said mist) to at least one diffusion orifice. Said diffusion orifice may be mounted directly on the surface of the table 60 or at a low height, or may be mounted on a diffusing mast 15 that projects above the surface of the table 60, as shown in FIG. 5.

In another embodiment said device 1 is fixed under the table 60 by means of runners 11 that may be situated in the accommodating compartment 13 (FIG. 6e) or which may replace the accommodating compartment.

Figures 6A, 6B, 6C:
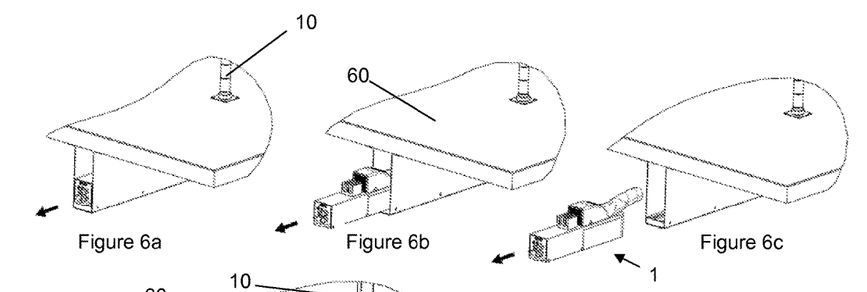
FIG. 6 illustrates the positioning (FIGS. 6d and e) and the removal (FIGS. 6a, b and c) of the device under a stall.
Figure 6D:
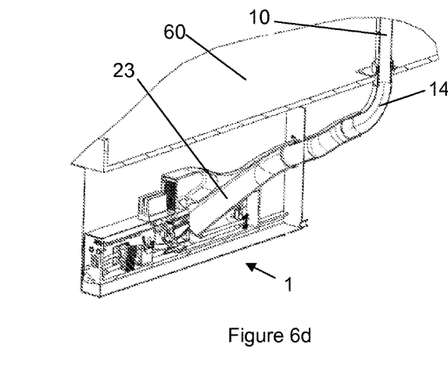
FIG. 6d shows the lateral perspective view of a vertical longitudinal section of the device, FIG. 6e its lateral perspective view.
Figure 6E:
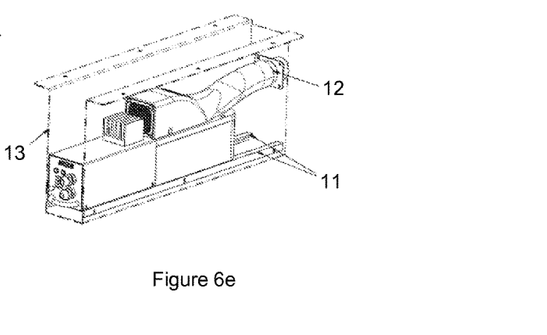

According to a particularly advantageous aspect of the invention, the system 1 according to the invention can be removed easily, for example it can be removed from its accommodating compartment 13 or can be removed by means of said runners. Three steps of this removal method are illustrated in FIGS. 6a, 6b and 6c (removal in the direction of the arrow). The removal method is greatly facilitated by the fact that the outlet tube 23 for the mist is simply inserted in said pipe 14; FIGS. 6d and 6e show two variants of this embodiment. It is not necessary for the connection between the outlet tube 23 for mist and the pipe 14 to be fixed; the seal is provided by the ring 55 situated in the groove 56 of the outlet tube 23. The removal can take place without a tool. The device 1, optionally after having disconnected its electrical supply cable and/or its liquid supply pipe, can next be placed on a table or a stall close by, or can be taken away for a maintenance operation. The device according to the invention, through its improved design, which is in particular modular, and which facilitates its access and dismantling, can simply be exchanged against another device 1, either new or in a good state of maintenance. This way of proceeding has the enormous advantage of not interrupting the functioning of the nebulization system except for a very brief period (around one minute or a few minutes) and avoiding carrying out maintenance on the device at its place of use, which is in general a place accepting the public.

The system 1 according to the invention may be supplied by a mains supply cable. Being designed so as to consume very little electrical energy (and to function at extra low voltage ELV) it can also be supplied by a supply cable that leads to a low-voltage transformer. It may also be supplied by a battery and a water reservoir (solid or flexible).

In this case, the battery and reservoir assembly is fixed to the table or to a mobile carriage. The user can move the carriage to a recharging zone, he connects the water inlet and the electrical inlet. This device is optimized in terms of use, the filling of the reservoir and the charging of the battery are automated.

Being able to avoid a direct supply to the mains makes it possible to install the device according to the invention in wet areas, where perfect isolation of individuals close to the device (customers, salespersons in the shop, maintenance personnel) cannot be guaranteed in all circumstances (a shelf for seafood for example). This represents another advantage of the system 1 according the invention.

The reduction in energy and in particular electrical consumption is obtained by virtue of the optimization of the output of the circulation pump 42, the diameter of the outlet 50 of the nozzle 49, the inclination of the nozzle 49, the form and inclination of the outlet tube 23 for the mist, the geometry of the ventilation pipes and the efficacy of the refreshing of the piezoelectric element 46 by virtue of its support 33 provided with an orifice 34.

For example, for an angle of 15o with respect to the horizontal, a nozzle diameter of 6 mm and a pump output of 1 liter/minute, the nebulization rate is approximately 1.9 liters per hour, which represents an output of 32 watt-hours per liter. With conventional systems, the output is approximately 75 watt-hours per liter. With a system according to the invention, the gain is approximately 58% of electrical energy for the same nebulization output.

According to another aspect of the invention, a certain number of the structure elements and functional elements of the device can be produced from plastics material (in particular polyamide, such as PA66), advantageously reinforced by glass fibers or other fibers. This makes it possible to lighten the device in order to facilitate manipulation thereof, and this can also facilitate the mass production of said elements by plastic molding methods. The following can be produced from suitable plastics materials in particular: the bottom frame 4, the tank module 5, and the top part 2 with the outlet tube 23 for the mist (with the exception of certain components of the motor of the fan 24). The cowl 3 of the electronic unit can also be produced from plastics material but, for reasons of electromagnetic shielding and heat dissipation, the use of a metal sheet may have advantages.

According to another aspect of the invention, the bottom frame 4 may comprise one or more stabilization plates 48, visible in FIG. 11, which, in the event of mechanical disturbance of the system 1, prevent an excessively great fluctuation of the level of liquid in the tank 7 and in the nozzle 49, said fluctuation in level being able to impair the continuous covering of the emitting surface of the piezoelectric element 46 with liquid. Said stabilization plates 48 may be disposed horizontally and/or vertically. They may comprise orifices. They may be disposed aslant.

FIG. 11 illustrates another embodiment of the invention that relates to the relationships between various volumes. The volume of liquid in the tank 7 is designated V1, the volume of liquid in the circulation pump and the conduits connecting it to the tank 7 (not shown in the figure) are designated V2, the volume of liquid in the pressurization chamber 52 at the bottom part of the nozzle 49 (i.e. less than the height that defines the bottom plane of the volume V5 (see below) is designated V3 and the volume of liquid in the nozzle 49 is designated V4. The volume V3 may be very small or even zero. V5 designates the volume of liquid in the top part of the pressurization chamber 52 situated at a liquid level higher than the highest of the following three points: the water inlet orifice 51 of the nozzle situated highest, or the top edge of the outlet orifice 50 at the outlet of the nozzle 49, the highest point of the piezoelectric ceramic 46. Thus, whatever the inclination a of the nozzle 49, any point of the piezoelectric ceramic 1 is situated at a level lower than the volume V5.

In normal operation of the system 1, the volumes V1, V2, V3, V4 and V5 are filled with liquid, the circulation pump 42 and the piezoelectric element 46 are functioning and generate a water jet 53 of approximately constant length, which illustrates the steady state of the system.

According to the invention, the pressurization chamber 52 is sized so that it has a buffer volume (safety volume) V5 sufficient with respect to the volume V4 of the nozzle 49, so that, in the case where the circulation pump 42 is no longer pumping any liquid (for example when the liquid level in the tank 7 is insufficient, or when the circulation pump 42 is drained), the volume V5 provides, for a certain period of time ts, the supply of water to the volume V4 of the nozzle 49, so that the piezoelectric element 46 is still immersed during this period of time ts. This period of time ts may, in whole or in part, be taken advantage of to cut off the supply to the piezoelectric element 46, and/or to wait to see if the level of liquid is re-established by itself (in particular in the case of mechanical disturbance or when the circulation pump 42 has simply taken in an air bubble). The time ts must be sufficiently long to allow total cutoff of the supply to the piezoelectric element 46 and stoppage of the functioning thereof; the applicant has in fact observed that the stoppage of functioning of the piezoelectric element 46 is not instantaneous when its electrical supply is cut off: the piezoelectric element 46 continues to vibrate while the circuits of its electrical supply are emptied.

In general, it is preferred in the context of the present invention for the ratio of the volumes V5/V4 to be at least 2 and preferably at least 6, and even more preferentially at least 12.

More precisely, the desirable reaction time for the system to cut off the electrical supply to the piezoelectric element 46 in the event of lack of water is taken into consideration. It is not necessarily desirable to cut off the supply at the least drop in level in the pressurization chamber 52, which would risk leading to an excessively intermittent generation of mist. However, it must be certain that, when this drop is prolonged or is aggravated beyond a certain period, the electrical supply to the piezoelectric element 46 should be cut off or at least greatly reduced. Thus the inventors consider that, in a mechanically unstable environment (vehicle, stall surrounded by a crowd of persons), the nebulization system 1 according to the invention must allow functioning of the piezoelectric element 46 during a period ts of between 1 and 10 seconds without a supply of liquid by the circulation pump 42, and preferably between 2 and 5 seconds.

In this context, an important parameter is the flow rate of liquid generated by the piezoelectric element 46 at the outlet of the orifice 50 of the nozzle 49 in the absence of any pumping by the circulation pump 42; this rate (which is often manifested by the presence of a small jet of water referred to as an "acoustic fountain") depends (for a given angle α of the positioning of the nozzle 49 and a given liquid) essentially on the power of the piezoelectric element 46.

Even more precisely, the rate of the acoustic fountain may be expressed by $$Q_{piezo} = K \times P_{max}$$

where Pmax is the maximum electrical power consumed by the piezoelectric element and Qpiezo is the flow rate of the acoustic fountain at this power Qpiezo, and K is a proportionality factor. A period of safety functioning of ts seconds is desired, that is to say when the circulation pump 10 ceases to function (in particular because of draining), the system has a period of approximately ts seconds for cutting off the supply to the piezoelectric element 46. Advantageously, the time ts is between 1 and 10 seconds, and a value of between 2 and 5 seconds is preferred. According to the invention, this objective can be achieved by providing a sufficient safety buffer volume V5, which corresponds to the volume of the pressurization chamber 52 situated at a level of liquid higher than the top edge of the outlet orifice 50 of the nozzle 49. This volume must be greater than the volume V4 of the nozzle 49.

It is therefore wished that $V5 > V4 = Q_{piezo} \times ts$.

This relationship can be expressed by $V5 > V4 + K \times P_{max} \times ts$.

In a typical example, a nozzle 49 with a volume V4 of 0.0054 liters is used, and Qpiezo is 50 W for a supply voltage of 22 V with an acoustic efficiency of approximately 40%; the angle α is between 0o and 30o. Under these conditions Pmax is approximately 1.5 liters/min, and consequently K=0.0005 liters/W·s. If a value ts=5 seconds is aimed at, V5 must be at least equal to 0.13 liters. The ratio V5/V4 is therefore 24. As indicated above, the value is may be less than 5 seconds, which tends to decrease the ratio V5/V4.

LIST OF REFERENCE NUMERALS

1 System
2 Top part
3 Cowl
4 Bottom frame
5 Tank module
6 Radiator
7 Tank
8 Electronic unit
9 Nozzle module
10 Nebulizer (diffuser)
11 Runner
12 Quick connection of end piece
13 Accommodating compartment
14 Pipe for mist
15 Diffuser mast
16 Orifice of nebulizer (diffuser)
21 Air inlet
22 Mist outlet end piece
23 Mist outlet tube
24 Fan
30 Electronic card
31 Electronic components 32 Electrical connector or cable
33 Piezoelectric element support
34 Orifice in support
35 Fixing element
36 Seal
37 Orifice
38 Rear wall of chamber
39 Liquid-level detector
41 Solenoid valve
42 Circulation pump
43 Level sensor
44 Water inlet
45 Heating element
46 Piezoelectric element
47 Drain
48 Stabilization plate
49 Acoustic concentrator (nozzle)
50 Nozzle outlet
51 Nozzle inlet orifice
52 Pressurization chamber
53 Jet of liquid
54 Body of top part
55 Seal ring
56 Groove
57 Rim
58 Hinge
60 Table (stall)

What is claimed is:

1. A nebulization device to generate a mist of droplets of a liquid, the nebulization device comprising:
an elongate-shaped bottom nebulization device frame having a tank module and a nozzle module, said nozzle module having an ultrasound acoustic concentrator nozzle provided with at least one liquid-inlet orifice and at least one liquid-outlet orifice, and, on a side opposite to said at least one liquid-outlet orifice, a piezoelectric element configured to emit acoustic waves in said liquid, and a cross section of said ultrasound acoustic concentrator nozzle having a gradual narrowing in a direction of said at least one liquid-outlet orifice, so acoustic waves are focused in said ultrasound acoustic concentrator nozzle so as to create the mist of droplets, said bottom nebulization device frame defining a longitudinal axis, and said concentrator nozzle defining a longitudinal axis that is to form an angle of inclination with respect to said longitudinal axis of said bottom nebulization device frame that is in a range of between 0° and 45°;
an elongate-shaped electronic unit including a cowl, situated on the longitudinal axis of said bottom nebulization device frame, and configured to form a single piece with, or be detachable from, the bottom nebulization device frame;
an top part having a tube to discharge the mist, and a ventilator configured to generate an air flow through said tube to discharge the mist, the top part being disposed above the bottom nebulization device frame so that a rear part of said tube extends into the bottom nebulization device frame and is situated at least partially inside the tank module, and a front part of the tube is projected outwardly from the bottom nebulization device frame towards a front of the nebulization device; and
a circulation pump connected to the tank module and said ultrasound acoustic concentrator nozzle by the at least one inlet orifice provided in said ultrasound acoustic concentrator nozzle, said circulation pump configured to generate in said concentrator nozzle a pressure of liquid to maintain a jet of liquid emerging through said at least one liquid-outlet orifice of the ultrasound acoustic concentrator nozzle.

2. The nebulization device of claim 1, wherein said electronic unit is situated behind said bottom nebulization device frame with respect to an outlet direction of the tube.

3. The nebulization device of claim 1, further comprising a pressurization chamber through which passes the liquid emerging from the circulation pump before entering said ultrasound acoustic concentrator nozzle,
wherein a first volume of a top part of the pressurization chamber is at least twelve times greater than a second volume of the ultrasound acoustic concentrator nozzle, the first volume being situated at a higher liquid level than the highest of:
the at least one liquid-inlet orifice of the ultrasound acoustic concentrator nozzle situated the highest,
a top edge of the at least one liquid-outlet orifice of the ultrasound acoustic concentrator nozzle, and
a highest point on an emitting surface of the piezoelectric element.

4. The nebulization device of claim 1, wherein said circulation pump is disposed in said electronic unit.

5. The nebulization device of claim 1, wherein the longitudinal axis of said ultrasound acoustic concentrator nozzle is substantially parallel to a longitudinal axis of said tube.

6. The nebulization device of claim 1, wherein a sum of cross-section areas of each of the at least one liquid-inlet orifices is at least three times greater than a cross-sectional area of the at least one liquid-outlet orifice.

7. The nebulization device of claim 1, wherein the longitudinal axis of said ultrasound acoustic concentrator nozzle forms an angle of inclination of between 5° and 20° with respect to the horizontal.

8. The nebulization device of claim 1, further comprising at least one plate to stabilize the liquid level of the liquid, wherein the at least one plate is disposed horizontally, vertically, or is slanted.

9. The nebulization device of claim 1, wherein the ventilator is to generate the air flow that is air flow that takes away said mist of droplets through said tube to a region outside of said nebulization device.

10. The nebulization device of claim 1, further comprising at least one liquid level detector to detect a lack of liquid associated with a feedback loop in order to stop or reduce an intensity of the acoustic waves emitted by the piezoelectric element upon detection of a lack of liquid.

11. The nebulization device of claim 1, wherein, adjacent to a tube outlet thereof, said tube is curved towards the horizontal, and the axis of the outlet is horizontal.

12. The nebulization device of claim 1, wherein the nebulization device is configured to be supplied with one or more of electrical energy by a battery and water.

13. A system, comprising:
a table or stall configured to display articles for sale, and having a display surface, at least one nebulizer that diffuses, through at least one nebulization orifice, a mist, a nebulization device disposed below the display surface, the nebulization device configured to generate the mist, the nebulization device having:
an elongate-shaped bottom nebulization device frame having a tank module and a nozzle module, said nozzle module having an ultrasound acoustic concentrator nozzle provided with at least one liquid-inlet orifice and at least one liquid-outlet orifice, and, on a side opposite to said at least one liquid-outlet orifice, a piezoelectric element configured to emit acoustic waves in a liquid, and a cross section of said ultrasound acoustic concentrator nozzle having a gradual narrowing in a direction of said at least one liquid-outlet orifice, so acoustic waves are focused in said ultrasound acoustic concentrator nozzle so as to create the mist, said bottom nebulization device frame defining a longitudinal axis, and said concentrator nozzle defining a longitudinal axis that is to form an angle of inclination with respect to said longitudinal axis of said bottom nebulization device frame that is in a range of between 0° and 30°;

an elongate-shaped electronic unit including a cowl, situated on the longitudinal axis of said bottom nebulization device frame, and configured to form a single piece with, or be detachable from, the bottom nebulization device frame;

an top part having a mist outlet tube to discharge the mist, and a ventilator configured to generate an air flow through said mist outlet tube to discharge the mist, the top part being disposed above the bottom nebulization device frame so that a rear part of said mist outlet tube extends into the bottom nebulization device frame and is situated at least partially inside the tank module, and a front part of the mist outlet tube is projected outwardly from the bottom nebulization device frame towards a front of the nebulization device; and a circulation pump connected to the tank module and said ultrasound acoustic concentrator nozzle by the at least one inlet orifice provided in said ultrasound acoustic concentrator nozzle, said circulation pump configured to generate in said concentrator nozzle a pressure of liquid to maintain a jet of liquid emerging through said at least one liquid-outlet orifice of the ultrasound acoustic concentrator nozzle; and a compartment configured to receive said nebulization device and thereby place said nebulization device in the operational position, said compartment having runners configured to permit movement of said nebulization device from the compartment and thereby remove the nebulization device from the operational position.

14. A system, comprising:

a nebulization device configured to generate a mist and a nebulizer that diffuses the mist through at least one nebulization orifice, the nebulization device having:

a bottom nebulization device frame having a tank module and a nozzle module, said nozzle module having an ultrasound acoustic concentrator nozzle provided with at least one liquid-inlet orifice and at least one liquid-outlet orifice, and, on a side opposite to said at least one liquid-outlet orifice, a piezoelectric element configured to emit acoustic waves in a liquid, said ultrasound acoustic concentrator nozzle being structurally configured to focus the acoustic waves in said ultrasound acoustic concentrator nozzle so as to create the mist, said bottom nebulization device frame defining a longitudinal axis, and said concentrator nozzle defining a longitudinal axis that is to form an angle of inclination with respect to said longitudinal axis of said bottom nebulization device frame that is in a range of between 5° and 20°;

an top part having a mist outlet tube to discharge the mist, and a ventilator configured to generate air flow through said mist outlet tube to discharge the mist, the top part being disposed above the bottom nebulization device frame so that a rear part of said mist outlet tube extends into the bottom nebulization device frame and is situated at least partially inside the tank module, and a front part of the mist outlet tube is projected outwardly from the bottom nebulization device frame towards a front of the nebulization device; and a circulation pump connected to the tank module and said ultrasound acoustic concentrator nozzle by the at least one inlet orifice provided in said ultrasound acoustic concentrator nozzle, said circulation pump configured to generate in said concentrator nozzle a pressure of liquid to maintain a jet of liquid emerging through said at least one liquid-outlet orifice of the ultrasound acoustic concentrator nozzle.

* * * * *